United States Patent [19]

Lemoine

[11] 4,261,796
[45] Apr. 14, 1981

[54] SELF-CLEANING FRACTIONAL WATER DISTILLER

[76] Inventor: Kenneth D. Lemoine, Rte. 1, Box 93, Gravette, Ark. 72736

[21] Appl. No.: 914,928

[22] Filed: Jun. 12, 1978

[51] Int. Cl.³ .......................... B01D 3/02; C02F 1/04; C02F 1/20
[52] U.S. Cl. .................................... 202/176; 202/180; 202/181; 202/193; 202/196; 202/234; 203/10; 203/39; 203/DIG. 2; 203/DIG. 25
[58] Field of Search ............... 202/180, 181, 182, 176, 202/177, 190–196, 206, 160, 153, 166, 167, 83, 234, 185 R, 185 C; 203/10, 11, 1, 99, 100, DIG. 2, 22, 39, DIG. 17, DIG. 25

[56] References Cited

U.S. PATENT DOCUMENTS

| 1,116,804 | 11/1914 | Daley | 202/166 |
| 3,340,157 | 9/1967 | Weiss | 202/180 |
| 3,532,606 | 10/1970 | Sibert | 202/180 |
| 3,696,003 | 10/1972 | Fitch et al. | 202/181 X |
| 3,849,260 | 11/1974 | Ruckstuhl | 202/181 |
| 3,907,683 | 9/1975 | Gilmont | 202/180 |
| 4,081,331 | 3/1978 | Weiss | 203/DIG. 2 X |
| 4,089,749 | 5/1978 | Karamian | 202/181 X |
| 4,110,170 | 8/1978 | Kirschman | 202/181 X |
| 4,113,571 | 9/1978 | Nygards | 202/181 X |

*Primary Examiner*—Wilbur L. Bascomb, Jr.
*Attorney, Agent, or Firm*—Robert R. Keegan

[57] ABSTRACT

There is disclosed a water distiller, primarily for producing water for human consumption which includes a boiler with an electric heater, a fractional distillation tower extending about two or more feet above the boiler, a gas trap at the top of the tower, and a steam conduit exiting from the tower below the gas trap and leading into a condensation tube with a water-cooled jacket. The boiler and tower are of uniform cross-section to facilitate cleaning by running a swab through this tube. An unprocessed water inlet is located in the bottom of the water jacket, and at the top of the water jacket is an exit orifice for preheated input water. A conduit for preheated input water leads to the bottom-most part of the boiler of the distiller. An overflow conduit is provided which is directly opposite the preheated water inlet; the highest point of the overflow conduit serves to automatically regulate the depth and volume of water in the boiler.

12 Claims, 5 Drawing Figures

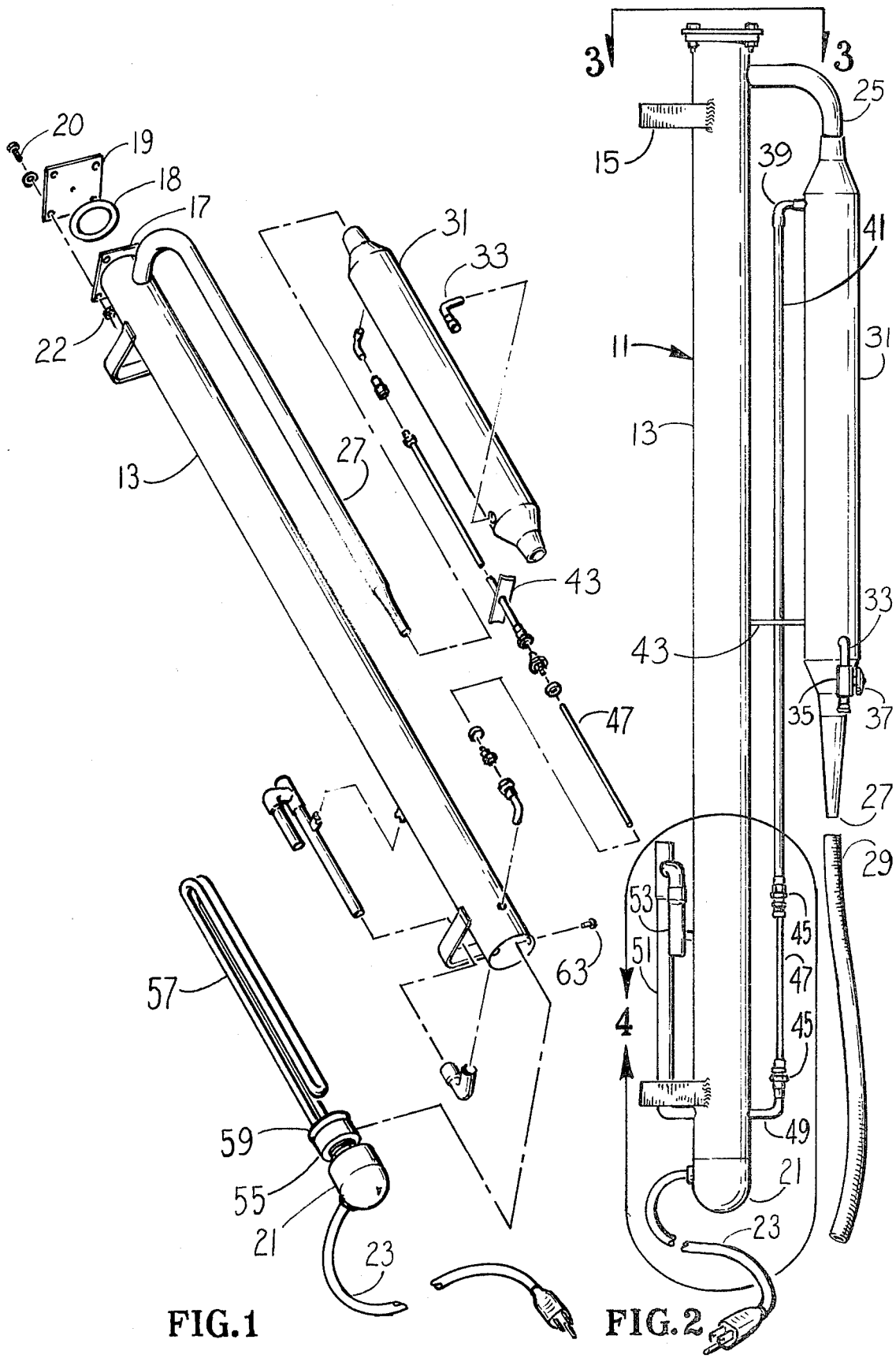

SELF-CLEANING FRACTIONAL WATER DISTILLER

As water pollution becomes more serious and the facts about it become better known, there is increasing effort to provide apparatus whereby water for human consumption may be purified in the home or in places of business. Various approaches are employed and are incorporated in apparatus offered commercially. These approaches include filtration, chemical treatment, heating or boiling, and distillation. Of these, only distillation offers the capability of producing truly pure water. Even distillation does not necessarily provide pure water, and the apparatus and manner in which the distillation is carried out is of utmost importance.

The production of virtually pure water is not a simple procedure due to the complications which have been introduced by widespread chemical pollution of water sources. Many, if not all, of our water sources today contain significant amounts of toxic pollutants. As described in the Clean Water Act, a toxic pollutant is a chemical which having been discharged into the environment causes death, disease, behavioral abnormalities, cancer, genetic mutations, physiological malfunctions (including malfunctions in reproduction), or physical deformations in living organisms or their offspring.

The list of common toxic pollutants is too long to recite in detail, but it includes many herbicides such as 2,4-D, pesticides such as DDT, Aldrin and Endrin; heavy metals such as mercury and cadmium; and organic chemicals such as Mirex, Kepone and PCB's.

All these water pollutants are not removed by merely boiling the tap water and condensing all the vapors to produce the "purified" product. If the distilling apparatus is not most carefully designed the pollutants may be carried through the distillation process and remain in the "purified" water produced from the distiller.

Of course, laboratory distillation apparatus has been known for decades, even centuries, and, especially by multiple distillation, water may be purified to just about any extent desired or until impurities are virtually undetectable. It is, however, quite impractical to use such complicated and expensive laboratory distillation apparatus for the production of household drinking water.

The present invention provides a quite simple but effective distiller for production of drinking water. The apparatus according to the invention is first of all effective to remove all pollutants whether solid, gaseous, organic or inorganic to the point of near immeasurability. The apparatus is self-cleaning in respect to dissolved and most solid residuals and provides long periods of operation between cleaning operations. At the same time, there is no hidden hazard as with filter systems which can become ineffective without one's knowledge or can even build up a breeding ground for organic pollutants. The energy required for operation of the distiller is kept to a low value as is the quantity of water used for carrying away impurities. The simplicity of the apparatus is achieved by using the principle of fractional distillation together with a long vertical column for the vapors for optimum rejection of all forms of pollutants. The preheating of the water to the boiler not only conserves energy but also results in a preliminary rejection of low boiling point or gaseous pollutants. The distiller can be operated with a low temperature distillate output which conserves energy and improves efficiency for most water supply conditions, but may also be operated with a high temperature distillate output in special circumstances where troublesome pollutants such as chloroform are present in the water and must be removed.

The distiller incorporates no pump and thus presents no possibility of water pollution from pump lubricant or wear particles. It also requires no cooling air circulating fan and thus has no moving mechanical parts requiring maintenance or producing noise or vibration. Operating only part of one day, the distiller can readily produce five gallons of pure distilled water which is normally more than adequate for even a large household.

In addition to providing the features and advantages described above, it is an object of the present invention to provide a distiller for water for human consumption or other purposes requiring no moving mechanical parts and employing an overflow flushing mechanism for self cleaning, pre-heating with removal of dissolved gases, and a trap for light gaseous pollutants.

It is another object of the present invention to provide a distiller for water for human consumption or other purposes wherein the apparatus is provided with an overflow tube taking excess water flow from near the bottom of the boiler of the distiller, thus removing dissolved and suspended solid residuals from the boiling water.

It is yet another object of the present invention to provide a distiller for water for human consumption or other purposes having an extended vertical chamber above the surface of the boiler water with a steam vapor exit near the top thereof and a gas trap located above the steam vapor exit having a separate small exit hole for trapped gases.

Other objects and advantages of the present invention will be apparent from consideration of the following description in conjunction with the appended drawings in which:

FIG. 1 is an exploded view of distiller apparatus according to the present invention;

FIG. 2 is a front elevational view of the apparatus of FIG. 1;

Figure 3:
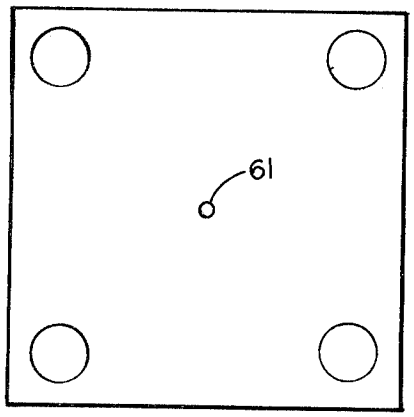
FIG. 3 is a top plan view of a portion of the apparatus of FIG. 1 and FIG. 2.

Referring to the drawings and in particular FIGS. 1 and 2, a distiller 11 is shown comprising a boiler tube 13 with brackets 15 for mounting the distiller on a wall surface. This is the preferred form of installation, although the distiller may also be placed on a stand or otherwise arranged in a vertical position as shown in FIG. 2. The vertical arrangement of the distiller permits gravity flow of input water and distilled water so that no pump is necessary.

As illustrated, the top of the boiler tube 13 is closed by a flange 17 and a cover plate 19. The flange 17 is welded to the top of tube 13. Cover plate 19 is fastened by suitable fasteners such as bolts 20 and nuts 22 to flange 17, thus closing the top of tube 13. An o-ring 18 is provided which seats in a recess (not shown) and provides a positive seal for the top cover 19. O-ring 18 may be omitted if desired; there is no absolute necessity for a tight seal at the top of tube 13, as this portion of the tube is occupied only by steam or vapors and the escape of a very small portion of the vapors would not be detrimental. In fact, plate 19 may be provided with a small opening (e.g. 3/32 inch diameter) to vent light gaseous pollutants where the water supply is heavily contaminated with such pollutants. Such an opening is shown at 61 in FIG. 3. Because the necessity for such an opening is unusual it is not provided as a normal matter, but instructions are provided for making this opening to optimize the distiller operation where serious problems with gaseous pollutants exist. The heater element base 21 closes the bottom of tube 13 as will be explained in the description of the heater apparatus. The heater apparatus line cord 23 passes into the heater base 21.

A condenser tube 25 opens into the boiler tube 13 near the top thereof but spaced slightly below the flange 17 and the plate 19. Condenser tube 25 is tapered at the lower end 27, at which end there is joined a section of flexible stainless steel tubing 29.

Preferably, at least the boiler tube 13, the condenser tube 25, and the flexible tube 29 are all constructed of stainless steel so that there are no potential contaminating materials in contact with the distilled water or with the steam which is condensed to produce the distilled water.

A water jacket 31 surrounds the condenser tube 25 and is provided with an inlet tube 33 at the lower end together with a control valve 35 with a control knob 37. In the usual installation, the household water is connected by a plastic tube to the inlet to valve 35 and valve 35 is used both to control the flow of water and also to turn the water to the distiller off completely. At the top of cooling jacket 31 is an outlet tube 39 which conducts the input water from the top of the cooling jacket 31 down through tube 41, fitting 45, flexible tube 47, fitting 45 and tube 49 to the bottom of boiler tube 13. Tube 41 passes through an opening in brace 43.

Figure 4:
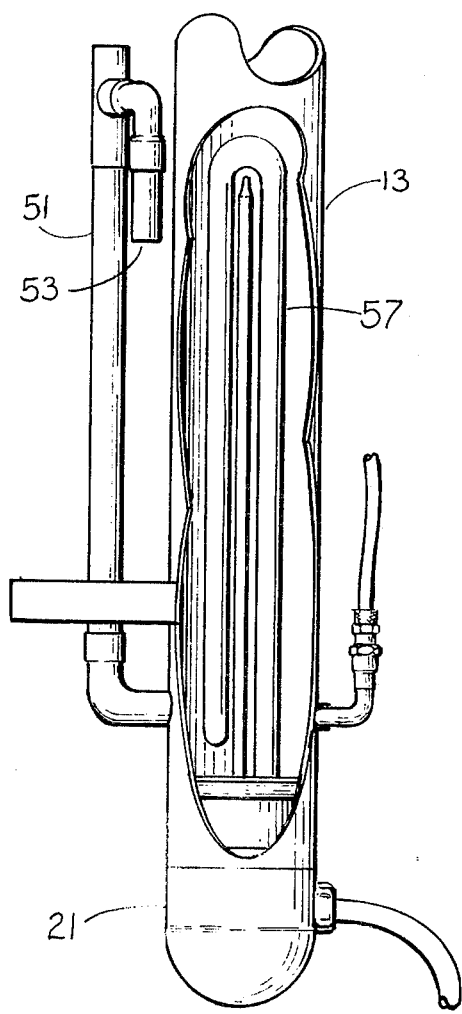
FIG. 4 is a front elevational detail view of the portion of the apparatus shown in FIG. 2.

It should be noted in FIG. 4 that while it appears that the inlet into the boiler tube 13 is spaced from the bottom of the boiler tube, actually the heater base occupies the space below the inlet to 49 for the boiler 13 and the inlet tube 49 is placed substantially at the bottom of the water space in the boiler 13.

Directly opposite the water inlet tube 49 is an overflow tube 51 which rises up the side of the boiler tube 13 and by its height controls and maintains the depth of the water in boiler tube 13. Drain tube 53 receives the overflow from the overflow tube 51, and in usual practice a flexible tube will be connected to the bottom of drain tube 53 and conducted to a sewer drain, to a holding vessel, or possibly to some appliance such as a washing machine which may make use of the waste water from the distiller.

As better seen in FIG. 1, an electric heater element 57 is provided for boiling the water in boiler 13. Heater element 57 has a base 55 which is a relatively snug fit in the bottom of boiler 23. An o-ring 59 provides a water-tight seal between base 55 and the inside wall of boiler tube 13. Base 55 is provided with a tapped hole to receive machine screw 63. Machine screw 63 passes through the opening 64 in boiler tube 13 and is threaded into the tapped opening in heater base 55 to secure the heater in place in the boiler tube 13 and to close the bottom of the boiler tube in a water-tight manner.

The distiller 13 is designed and constructed to minimize the necessity for cleaning the apparatus, but it will be noted that the provisions for opening the top of tube 13 and also for removing the heater and bottom cover permit easy access to the interior of boiler tube 13, and it can accordingly be cleaned as one would clean a gun barrel by forcing wadding or a swab through the tube or by the use of brushes.

The open top of overflow tube 51 is also provided to facilitate cleaning and a flexible brush may be provided to facilitate cleaning this portion of the apparatus. Of course, chemical cleaners could also be used for cleaning the apparatus, but this is not desirable or recommended and would rarely be necessary.

Figure 5:
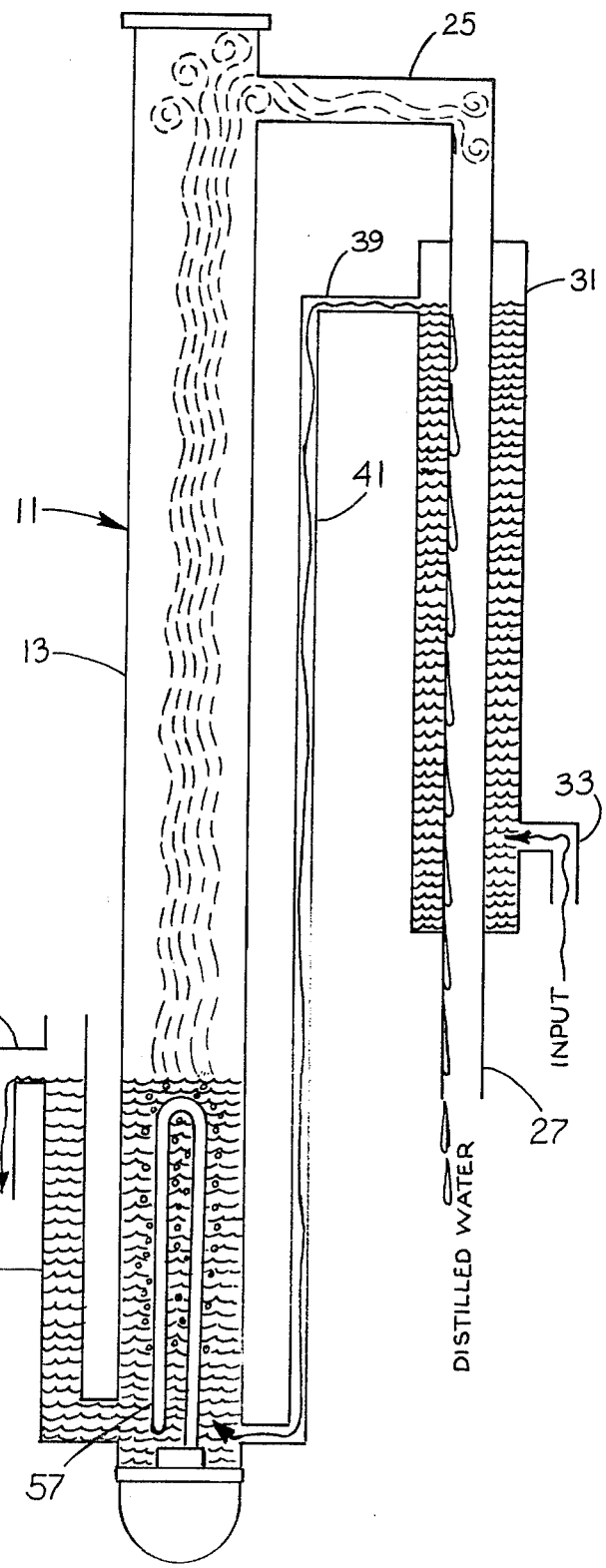
FIG. 5 is a schematic illustration of the various components of the apparatus of FIGS. 1 and 2 useful in explaining the operation thereof.

The operation of the apparatus is best understood by reference to FIG. 5 in which the elements of the apparatus are shown schematically and are given the same numbers as in FIGS. 1 and 2.

The water to be purified enters the input tube 33 at the bottom of the cooling jacket 31. The rate at which water is supplied to this system will vary under different conditions and circumstances but may be on the order of one to ten fluid ounces per minute. The input water rises in the cooling jacket 31 to the level of the outlet 39. It may be noted that the water pressure required is minimal, being only that necessary to raise the water in cooling jacket 31 to the level of output 39. It is important, however, that the water supply to the apparatus be on at all times that the heating element is on, otherwise the water in the boiler may boil away and cause the heating element to burn out. The water continues to fill apparatus until the water in the boiler tube 13 and in overflow tube 51 reaches the level of the outlet tube 52 and the water spills from the distiller while maintaining that level in the boiler 13.

In operation, the water entering at 33 will be relatively cool, but it comes in contact with the condenser tube 25 which is, of course, heated by the steam from boiler tube 13. Thus the water in cooling jacket 31 is heated, and in general the temperature of water jacket 31 will be warmer as one moves up the wall of the jacket and quite hot at the top of the jacket near outlet 39.

While serving to absorb the heat from the steam from boiler 13 and thus condense it to liquid form, the inlet water is also heated before passing into boiler 13, thereby conserving energy in the system.

The purpose of the overflow arrangement is to prevent buildup of minerals and impurities in the boiler water or on the boiler surfaces. The heater 57 is large enough to boil the water in the boiler vigorously. For example, in the apparatus shown, the heater is a 110 volt 1500 watt heater in the standard apparatus; it may be replaced with a 3000 watt heater operating on 220 volts, if one wishes to increase the output of the distiller. In either case, the water in the distiller has a depth of about 12 inches and the boiler diameter is about 4 inches so that substantial turbulence and mixing is generated in the boiler by the vigorous boiling induced by heater 57.

To the extent that there is any tendency for precipitates to settle to the bottom of the boiler, the placement of the overflow opening substantially at the bottom of the boiler is important in preventing any collection or buildup of solids in the boiler. It is particularly important to prevent buildup of solids at the inlet 49 and in the overflow tube 51. The placement of the inlet and the outlet at the bottom of the boiler with the inlet opposite the overflow has been found to be particularly effective in reducing the buildup of solids in the critical areas and thus lengthening the time between cleanings of the distiller. It has been found, unexpectedly, that it is not desirable to provide a trap for solids below the level of the outlet to overflow tube 51. The time between cleanings will vary according to water conditions, but even in adverse conditions, the distiller may be expected to run six months without cleaning.

The importance of this self-cleaning feature cannot be underestimated, as the necessity for frequent cleaning will cause the average user to discontinue use of the distiller for substantial periods of time and return to the use of unpurified water with the adverse consequences that entails. The self-cleaning aspect of the distiller is also important to avoid buildup of pollutants in the boiler water. When the level of boiler water pollutants reaches a certain point, any distiller finally becomes ineffective in preventing vapors from the pollutants passing into the condensation chamber and thus contaminating the output of the distiller.

Preferably, the outer surface of the distiller, particularly the boiler tube 13 is chromium plated or otherwise provided with a bright surface to reduce radiation and heat loss from the apparatus. The heating element 57 is submerged at all times during operation of the apparatus and thus is prevented from over-heating. In addition, the heating element 57 may be provided with a thermostatic control to turn off at a temperature just above the boiling point of water; for example, about 220°. Such a thermostat would tend to prevent damage to the heating element if the water level inadvertently falls in the boiler. However, in the absence of some error in the operation of the apparatus the water always will be maintained at the level determined by overflow tube 51 and drain tube 53.

The original adjustment of the waterflow may proceed as follows.

The supply of water to the input 33 is turned on. This supply will typically be a saddle-tapping valve and a connecting tubing, the saddle-tapping valve being connected to a cold water pipe. The meter valve 35 is turned on and time is allowed for the unit to fill with water and for water to commence overflowing through the drain tube. The meter valve is closed until water is being discharged at the rate of about one ounce per second. The heater 57 is turned on by plugging the unit into the electrical power supply. After the unit has been operating for ten or fifteen minutes, the distilled water being produced should be cool-to-warm (80° F. to 120° F.) but not hot. Also, the bottom six inches of the condensing chamber 31 should be cool and the top six to ten inches should be hot. Adjustments in the meter valve are made as necessary to obtain the above described conditions. Increasing the water flow will, of course, produce a cooler temperature for the condenser and for the output of the distiller while decreasing the flow produces hotter temperatures.

In certain areas with difficult water problems, it is necessary to operate at higher temperatures than those previously indicated. In such areas it is also desirable that the hole 61 in cover plate 19 be provided. In such cases, the meter valve should be adjusted to produce distilled water at 150° F., as measured by a cooking thermometer for example. Extremely small amounts of some impurities can be detected by taste or smell, and in order to completely remove such impurities to below the level of detection, it may be necessary to raise the distilled water output temperature above 150° F. by ten degree steps by careful closing of the meter valve. Of couse, the meter valve is never closed to the point where overflow from the distiller is cut off.

Another modification of the distiller for special situations involves placing a relief tube at the top of the cooling jacket to release vapors from low boiling point pollutants and thereby divert them from the boiler chamber. While this may be accomplished simply by placing a small opening 32 in the top of the cooling jacket 31, this produces a minor hazard of overflow from the cooling jacket in the event that there is a plugging of the inlet 49 or the overflow 51. Therefore, it is preferred that the opening at the top of the water jacket be provided with a tubing, which may be flexible plastic tubing, leading to the top of overflow tube 51 so that in the event of blockage, the overflow from cooling jacket 31 would harmlessly drip into overflow 51 and be carried away in drain tube 53.

It may also be noted that the effectiveness of the distiller system is enhanced by the fact that the cooling jacket 31 acts as a settling vessel preventing any solid particulate matter in the water supply from entering the boiler. Although it is unlikely that the necessity would ever arise, any accumulation of solids in the cooling jacket 31 may be removed by back flushing the cooling jacket 31 with chemicals through tube 41. Disconnecting tube 47 permits cleaning of tube 41 or 49.

From the foregoing description and explanation it will be seen that the distiller system illustrated and described provides an efficient source of highly purified water for human consumption or other purposes. It is quite energy-efficient, particularly when it is adjusted to produce a quantity of overflow water in the ratio of one or two to the quantity of distilled water. A most important feature of the apparatus is the infrequency of the necessity for cleaning. Cleaning in most cases will be required only after several hundred gallons or more of distilled water is produced. The smooth, clean-line construction of the boiler and vapor column facilitate cleaning the apparatus when necessary. The self-cleaning feature of the distiller not only lessens the necessity for dismantling and cleaning but also avoids the hazard of producing contaminated water due to a buildup of pollutants in a boiler, filters, or other paraphernalia.

Other modifications and variations of the apparatus in addition to those shown or suggested will be apparent to those skilled in the art and accordingly the scope of the invention is not to be deemed to be limited to the specific embodiments described or suggested, but it is rather to be determined by reference to the appended claims.

What is claimed is:

1. Distillation apparatus comprising,
   a boiler having at the bottom thereof a liquid inlet and a liquid outlet opposite thereto,
   a heater for heating the liquid content of said boiler,
   a vapor column receiving vapor produced in said boiler, said vapor column vertical dimension being at least four times its greatest horizontal dimension, said boiler and said vapor column forming one continuous cylindrical chamber, the top and bottom of which are removable,
   a vapor column outlet near the top of said vapor column,
   a condenser with a vapor channel and a liquid cooling element having an inlet and an outlet, said channel being connected to said vapor column outlet and having a distilled liquid outlet, and said liquid cooling element having an orifice near the top thereof for the escape of gases released from the liquid therein,
   a liquid conduit connected from the outlet of said liquid cooling element to the inlet of said boiler, and an overflow tube connected to the outlet of said boiler.

2. Apparatus as claimed in claim 1 wherein the outlet of said cooling element is at a higher level than the inlet of said boiler.

3. Apparatus as claimed in claim 1 wherein said heater is an electric heater having a heating element extending upward into said boiler.

4. Apparatus as claimed in claim 1 wherein said vapor column has a small opening to the atmosphere located above said vapor column outlet.

5. Apparatus as claimed in claim 1 further including a valve for metering the flow of liquid to the inlet of said cooling element.

6. Distillation apparatus comprising,
a boiler having at the bottom thereof a liquid inlet and a liquid outlet opposite thereto,
a heater for heating the liquid content of said boiler,
a vapor column in the form of a vertically elongated cylindrical chamber receiving vapor produced in said boiler, said vapor column vertical dimension being at least four times its greatest horizontal dimension,
a vapor column outlet spaced below the top of said vapor column,
a condenser adjacent said column with a central vapor channel and a surrounding liquid cooling jacket having an inlet near the bottom and an outlet near the top thereof, the top of said channel being connected to said vapor column outlet and the bottom of said channel having a distilled liquid outlet, and said liquid cooling jacket having an orifice near the top thereof for the escape of gases released from the liquid therein,
a liquid conduit connected from the outlet of said jacket to the inlet of said boiler,
an overflow tube connected to the outlet of said boiler and extending upward to an opening to the atmosphere above the desired level of liquid in said boiler,
and a downwardly extending drain tube connected into said overflow tube at the vertical level of the desired liquid level in said boiler.

7. Apparatus as claimed in claim 6 wherein the outlet of said jacket is at a higher level than the inlet of said boiler.

8. Apparatus as claimed in claim 6 wherein said boiler liquid inlet is opposite said boiler liquid outlet.

9. Apparatus as claimed in claim 6 wherein said heater is an electric heater having a heating element extending upward into said boiler.

10. Apparatus as claimed in claim 6 wherein said boiler and said vapor column form one continuous cylindrical chamber, the top and bottom of which are removable.

11. Apparatus as claimed in claim 6 wherein said vapor column has a small opening to the atmosphere located above said vapor column outlet.

12. Apparatus as claimed in claim 6 further including a valve for metering the flow of liquid to the inlet of said cooling jacket.

* * * * *